United States Patent [19]

Hinoshita et al.

[11] 3,887,763

[45] June 3, 1975

[54] VIDEO SIGNAL TRANSMISSION SYSTEM

[75] Inventors: Shigehiko Hinoshita, Yokohama; Yukihiko Minejima, Kawasaki; Takao Moriya, Yamato, all of Japan

[73] Assignee: Fujitsu Limited, Kawasaki, Japan

[22] Filed: July 17, 1973

[21] Appl. No.: 380,117

[30] Foreign Application Priority Data

July 19, 1972 Japan ................................ 47-71596

[52] U.S. Cl. ................................ 178/6; 178/DIG. 3
[51] Int. Cl. ................................ H04n 1/00
[58] Field of Search ............................ 178/DIG. 3, 6

[56] References Cited

UNITED STATES PATENTS

| | | | |
|---|---|---|---|
| 2,874,214 | 2/1959 | Anderson | 178/DIG. 3 |
| 2,921,124 | 1/1960 | Graham | 178/DIG. 3 |
| 3,324,237 | 6/1967 | Cherry | 178/DIG. 3 |
| 3,366,739 | 1/1968 | Parkinson | 178/DIG. 3 |
| 3,632,865 | 1/1972 | Haskell | 178/DIG. 3 |
| 3,736,373 | 5/1973 | Pease | 178/DIG. 3 |
| 3,769,451 | 10/1973 | Connor | 178/DIG. 3 |
| 3,795,763 | 3/1974 | Golding | 178/DIG. 3 |

*Primary Examiner*—Howard W. Britton
*Assistant Examiner*—Michael A. Masinick
*Attorney, Agent, or Firm*—Staas & Halsey

[57] ABSTRACT

A video signal transmission system for transmitting a video signal with its band width being compressed. On the transmitting side, there is provided a synchronizing signal generator for generating a horizontal synchronizing signal and a picture element clock signal. A regularly selective transmitter supplied with the output from the synchronizing signal generator to selectively remove picture elements of the video signal with a predetermined frame period. Thus, the video signal is formed into a plurality of sequences, which are and sequentially transmitted. On the receiving side, there is provided a synchronizing signal generator for generating a horizontal synchronizing signal and a picture element clock signal synchronized with those on the transmitting side, a frame memory for storing the video signal of one frame, and a movement detector for comparing the video signal sequence transmitted from the transmitting sides with those video signal sequences stored in the frame memory to determine whether the video signal of the transmitted sequence belongs to a moving picture or to a stationary picture and to produce a signal in accordance with the result of the comparison, the transmission station has no frame memory. The movement detector is included in the receiving station, therefore there is no need of transmitting a movement detecting signal.

6 Claims, 17 Drawing Figures

75

VIDEO SIGNAL TRANSMISSION SYSTEM

BACKGROUND OF THE INVENTION

1. Field of the Invention

This invention relates to a video signal transmission system, and more particularly to a video signal transmission system of the type wherein band width compression is achieved.

2. Description of the Prior Art

The so-called regular replenishment system has been proposed as a video signal transmission system. This system is of such a construction as depicted in FIG. 1. In the figure, broken-line blocks 1 and 2 represent transmitting and receiving stations, respectively. A video signal input is applied to an input terminal 3, and horizontal and vertical synchronizing signals are applied to a terminal 4. Reference numeral 6 indicates a frame memory, 7 refers to a movement detector, 8 identifies a regularly selective transmitter, 9 relates to a synchronizing signal generator, 10 specifies a frame memory, 11 identifies an adaptive interpolator, 12 indicates a synchronizing circuit, and 13 refers to a transmission line.

There has heretofore been proposed (in, for example, Bell System Technical Journal 1971, Vol. 1) a system of the type in which a video signal is regularly thinned out in accordance with a predetermined pattern in the transmitting station 1 and transmitted therefrom and, at the same time, a movement detecting signal for indicating whether the thinned-out picture element of the video signal belongs to a stationary picture or a moving picture is transmitted; in the receiving station, a device (hereinafter referred to as a frame memory) is provided for storing a video signal corresponding to one picture, and where the thinned-out signal belongs to the stationary picture, it is interpolated from the content of the frame memory, i.e. the immediately preceding frame (temporal interpolation) and where it belongs to the moving picture, it is interpolated from the received signal, i.e. the present frame signal (spatial interpolation). This conventional system necessitates the provision of the frame memory within each of the transmitting and receiving stations 1 and 2 and the transmission of the movement signal.

The operation of the circuit of FIG. 1 will be described more in detail with reference to FIG. 3. FIG. 3 shows a sampling pattern, that is, a video signal having 2n unit elements in horizontal and vertical directions, for explaining the regularly selective system. Reference characters $Aij$ and $Bij$ ($i$=1, 2, 3, . . . $n$ and $j$=1, 2, 3, . . . $n$) indicate picture elements of one frame. For example the $Aij$ signal sequence is transmitted in a first frame, and $Bij$ signal sequence is transmitted in the next or second frame. In operation of the transmitting station 1 in FIG. 1, a PCM video signal derived from the input terminal 3 is regularly thinned out by the regularly selective transmitter 8 in accordance with the pattern of FIG. 3 and transmitted. For example, alternate ones of the signals, each corresponding to each picture element: $A_{11}$, $A_{12}$, $A_{13}$, . . . $A_{21}$, $A_{22}$, . . . $A_{31}$, . . ., i.e. the $Aij$ signal sequence is transmitted in the first frame and, in the next or second frame, signals $B_{11}$, $B_{12}$, $B_{13}$, . . . $B_{21}$, $B_{22}$, . . . $B_{31}$, . . . , i.e. the $Bij$ signal sequence, is transmitted. The movement detector 7 judges whether the picture at the present time is a stationary one or a moving one, based on the input signal being applied at the present time and a signal delayed for one frame period, which is derived from the frame memory 6, and produces a movement detecting signal representative of the result of that judgement.

The receiving station 2 receives the thinned-out video signal and the movement detecting signal, and writes the received video signal in the frame memory 10. At the same time, the receiving station 2 subjects the thinned-out signal to proper temporal interpolation or spatial interpolation by the adaptive interpolator 11 in accordance with the movement detecting signal, and then writes it in the frame memory 10 to derive at the output terminal 5 the content of the frame memory 10 as a video output. For the interpolation of the thinned-out signal, for example, $B_{31}$ in FIG. 3, when the signal $B_{31}$ belongs to a stationary picture, the signal $B_{31}$ of the immediately preceding frame stored in the frame memory 10 is used and when the signal $B_{31}$ belongs to a moving picture, it is interpolated from the $Aij$ signal sequence being received at the present time and then written in the frame memory 10.

It is reported that this system causes negligible deterioration of picture quality in the case of band width compression of about one-half or so. With this system, however, it is necessary to provide in the transmitting station 1 the frame memory 6 for the movement detection and insert the movement detecting signal in the video signal to be sent out into the transmission line 13.

SUMMARY OF THE INVENTION

One object of this invention is to provide a video signal transmission system which is improved from the aforesaid conventional system and which is of extremely simple circuit construction on the transmitting side.

Another object of this invention is to provide a video signal transmission system which effectively utilizes the property of the video signal to thereby dispense with a frame memory on the transmmitting side and simplify a transmission signal without introducing a signal of a movement detector into the transmission path.

In accordance with these and other objects, there is provided a video signal transmission system for transmitting a video signal of compressed bandwidth over a transmission medium, comprising a transmission station including a synchronizing signal generator for producing a first clock signal synchronized with the video signal, and a regularly selective transmitter responsive to the first clock signal for removing selected ones of the picture elements of the video signal, for forming a plurality of video signal sequences and for transmitting sequentially the video signal sequences to the transmission medium with a predetermined frame period. Further, there is included a receiving station comprising a synchronizing signal generator for producing a second clock signal synchronized with the first clock signal of the transmission station, a frame memory for storing the transmitted video signal of one frame, a movement detector for comparing the video signal sequence transmitted from said transmission station with those video signal sequences stored in the frame memory for judging whether the video signal of the sequence transmitted belongs to a moving picture or to a stationary picture and for producing a movement detecting signal in accordance therewith, and an adaptive interpolator for storing the most recently transmitted video signal sequence in place of the previous video signal sequence stored in said frame memory and, at the same time, for replacing a value interpolated from the most recently-received video signal sequence for a video signal sequence stored in the frame memory but not corresponding to the newest-received video signal sequence in accordance with the movement detecting signal, where the received video signal sequence belongs to the moving picture.

BRIEF DESCRIPTION OF THE DRAWINGS

These and other objects and advantages of the present invention will become more apparent by referring to the following detailed description and accompanying drawings, in which.

DESCRIPTION OF THE PREFERRED EMBODIMENTS

With the reference to the drawings, this invention will hereinafter be described in detail.

Figure 1:
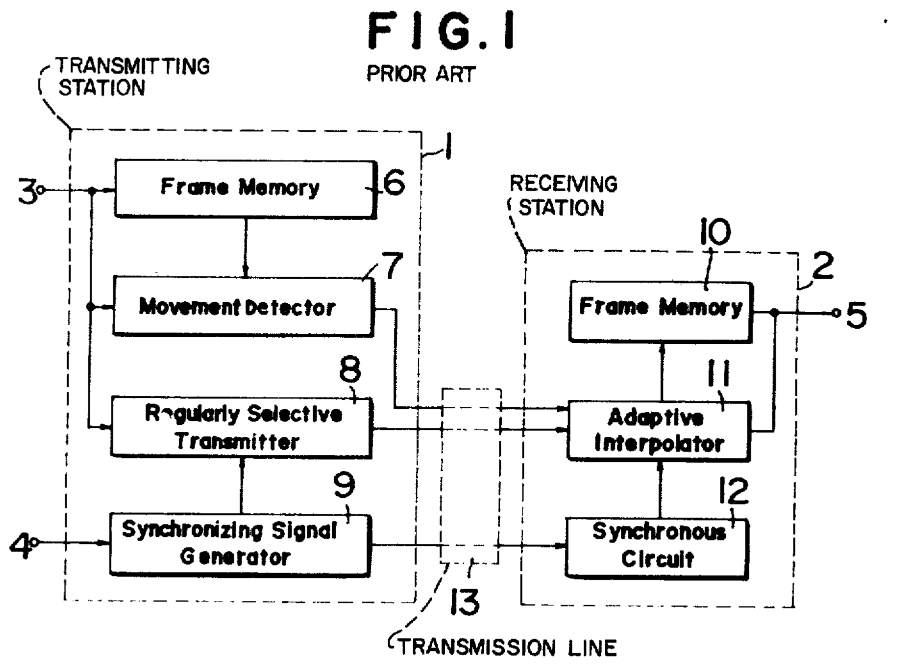
FIG. 1 PRIOR ART
FIG. 1 is a block diagram, for explaining a conventional system of the prior art.
Figure 2:
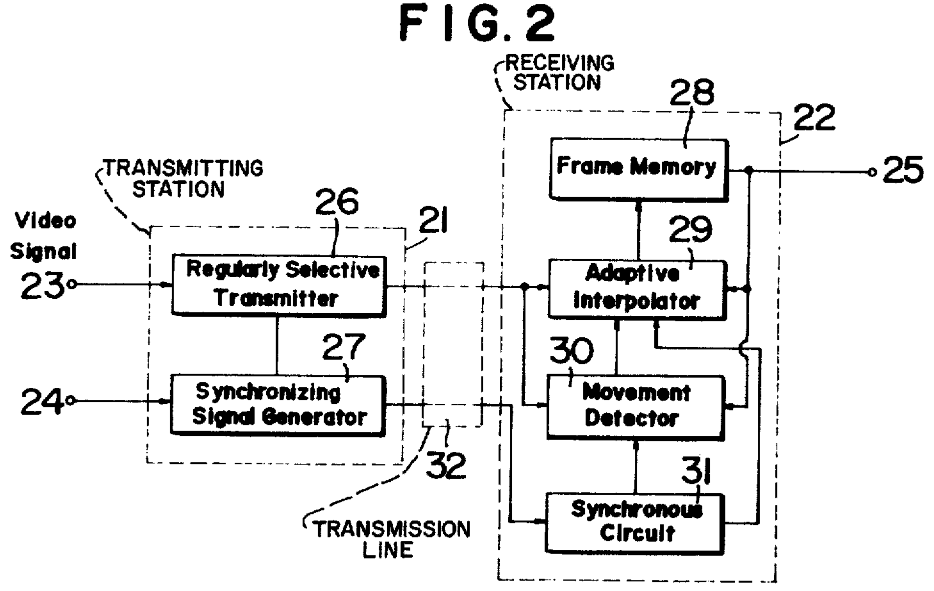
FIG. 2 is a block diagram, for explaining a video signal transmission system of this invention.
Figure 3:
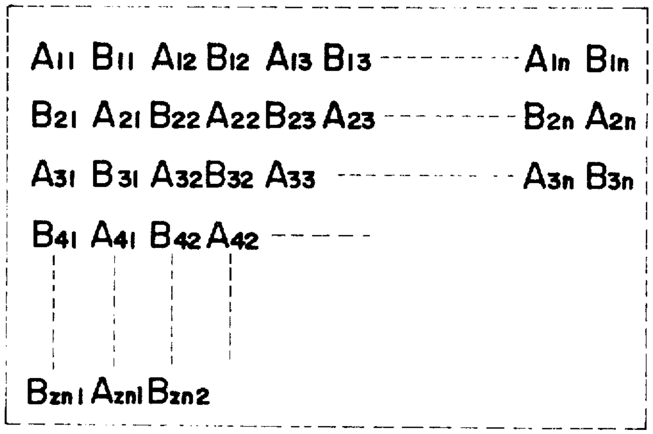
FIG. 3 shows a sampling pattern of a video signal as provided by regular transmission system.

FIG. 2 illustrates in block form the system of this invention. In FIG. 2, broken-line blocks 21 and 22 represent transmitting and receiving stations respectively and reference numeral 26 indicates a regularly selective transmitter, 27 refers to a synchronizing signal generator, 28 identifies a frame memory, 29 indicates an adaptive interpolator, 30 refers to a movement detector, 31 relates to a synchronizing circuit and 32 a transmission line or medium. In FIG. 2, a video signal is applied to a terminal 23 and horizontal and vertical synchronizing signals are applied to a terminal 24. Let it be assumed that the video signal has 2n unit elements in horizontal and vertical directions respectively as shown in FIG. 3. The video signal applied through the input terminal 23 is regularly thinned out, i.e. selected picture elements of the video signal are removed, and selectively transmitted from the regularly selective transmitter 26. In the receiving station 22, it is judged by the movement detector 30 from the received signal and a signal stored in the frame memory 28 whether the thinned out signal belongs to a stationary picture or moving picture, and the result of the judgement is applied to the adaptive interpolator 29. Based on the transmitted video signal and the judgement result, the adaptive interpolator 29 interpolates the thinned-out signal on the time base or space base in the same manner as in the conventional system and applies it to the frame memory 28, thus effecting rewriting.

The detailed construction of this invention system will be described with regard to a more detailed circuit diagram. For the sake of brevity, assume that the video signal is not interlaced and has $2n$ unit picture elements disposed in horizontal and vertical directions as shown in FIG. 3. The picture elements will be described as being divided into A($A_{ij}$) and B($B_{ij}$) sequences and each block in FIG. 2 will be described in detail.

Figure 4:
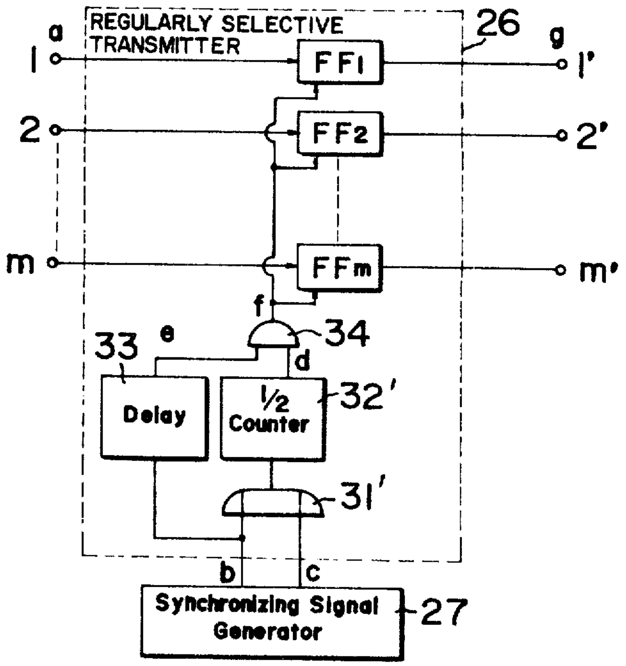
FIG. 4 is a block diagram illustrating one example of a regularly selective transmitter incorporated in the transmitting station of the system of FIG. 2.
Figure 5:
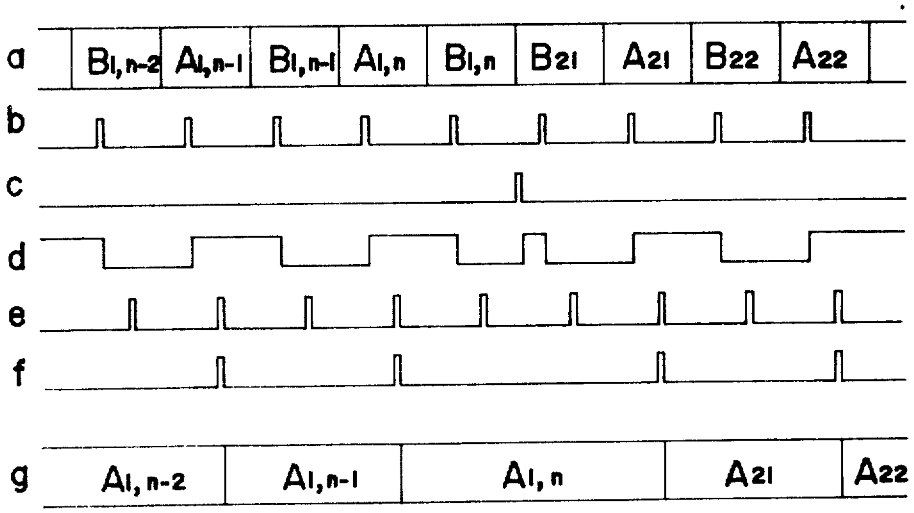
FIG. 5 is a time chart showing the operaton of each unit in FIG. 4.

FIG. 4 illustrates one example of the regularly selective transmitter 26 (in the broken-line block 21 in FIG. 2). In FIG. 4, reference characters FF1, FF2, . . . FFm indicate flip-flops and reference numeral 31 designates an OR gate, 32' refers to a 1/2 counter, 33 indicates a relay circuit, and 34 relates to an AND and 27 corresponds to the synchronizing signal generator 27 in FIG. 2. The regularly selective transmitter 26 will be described in connection with the picture elements depicted in FIG. 3. Let it be assumed that the $A_{ij}$ sequence composed of the A sequence picture elements, i.e. elements $A_{11}$, $A_{12}$, $A_{13}$, . . . $A_{21}$, $A_{22}$, . . . $A_{31}$, . . . is transmitted and that an input video signal $a$ is composed of $m$-bit PCM parallel signals applied to terminals 1, 2, . . . $m$. The synchronizing signal generator 27 generates a picture element clock signal $b$ and a horizontal scanning clock $c$, which are supplied to the OR gate 31 to provide an OR output, which is then 1/2 counted down by the one-half counter 32'. The outputs $d$ and $e$ derived respectively from the one-half counter 32' and $e$ from the delay circuit 33 are applied to the AND gate 34 to obtain an AND output $f$, by which the flip-flops FF1, FF2, . . . FF$m$ are opened and closed. Waveforms of these signals are shown in FIG. 5, in which the waveforms marked with $a$ to $g$ correspond to the terminals identified by the same reference characters in FIG. 4. It will be readily understood that outputs appearing at output terminals 1', 2', . . . $m'$ are arranged in such a form as indicated by $g$ (in FIG. 5).

Figure 6:
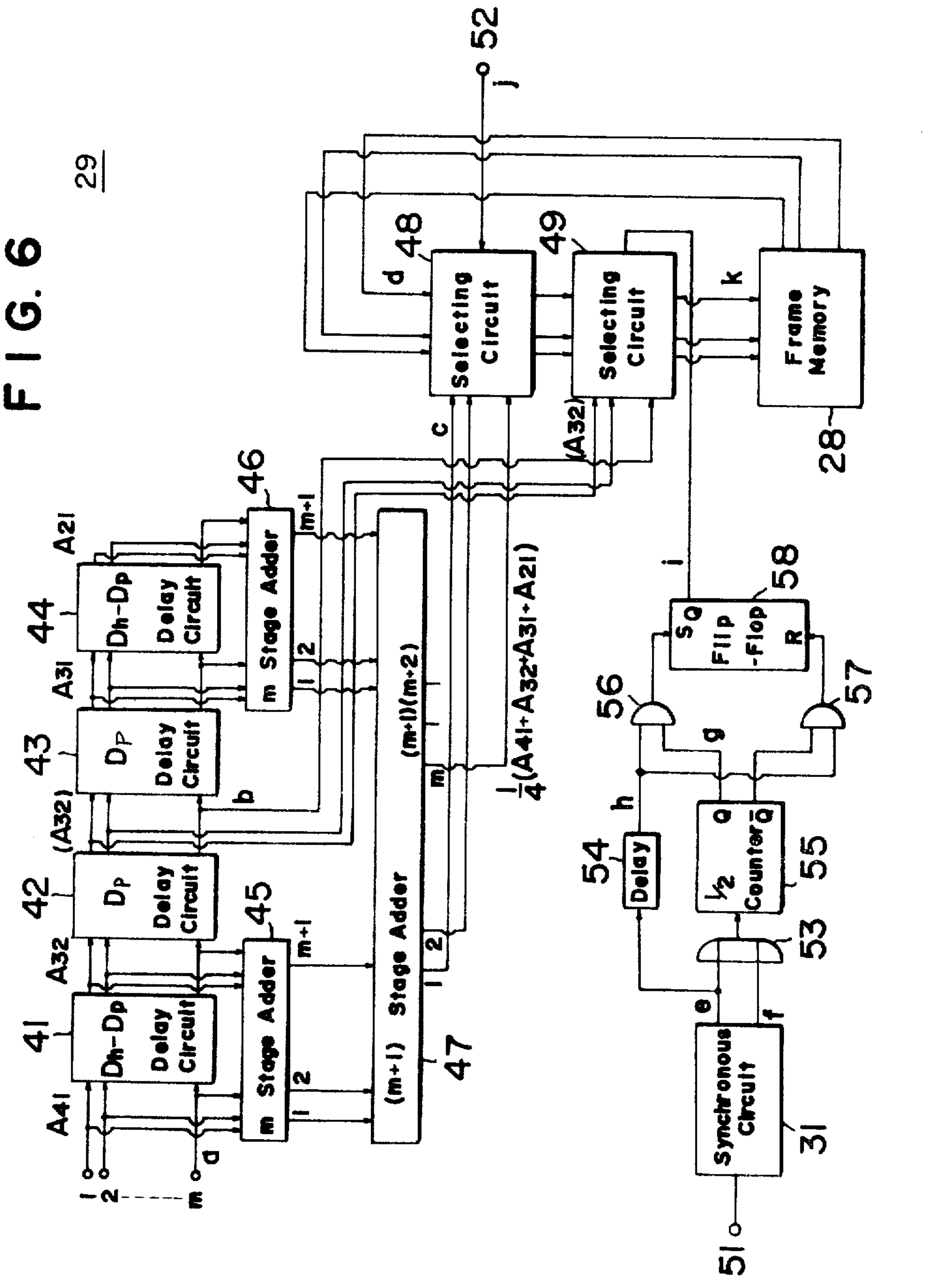
FIG. 6 is a block diagram illustrating one example of an adaptive interpolator employed in the receiving side in FIG. 2.

Next, the adaptive interpolator 29 of FIG. 2 will be described. This circuit achieves the following operation. This will be discussed on the assumption that the A sequence signal thinned out by the regularly selective transmitter 26 at the transmitting station 21 is received. As to the B sequence, in the case of a stationary picture, the B sequence of the preceding frame stored in the frame memory 28 is used but when it is judged by the movement detector 30 to belong to a moving picture, it is excellent from the viewpoint of picture quality to produce the B sequence picture elements by interpolating them from the received A sequence. The circuit shown in FIG. 6 is one example of the adaptive interpolator 29 (refer to FIG. 2) for performing the above operation. In FIG. 6, assuming that m-bit PCM signals are applied to left-hand terminals 1, 2, . . . *m*, these signals pass through delay circuits 41, 42, 43 and 44. Provided that D*h* provides a delay of one horizontal line period and that D*p* provides a delay of one picture element, the delay circuit 41 provides a delay of (D*h*–D*p*), the delay circuits 42 and 43 each provides a delay of one picture element D*p* and the delay circuit 44 provides a delay of (D*h*–D*p*).

Upon impression of a picture element $A_{41}$ to the input terminals 1, 2, . . . *m*, a picture element signal $A_{32}$ appears at the output side of the delay circuit 41, a signal ($A_{32}$) delayed one picture element behind the signal $A_{32}$ appears at the output side of the delay circuit 42, a signal $A_{31}$ appears at the output side of the delay circuit 43 and $A_{21}$ appears at the output side of the delay circuit 44. As illustrated in FIG. 6, these signals are added together by *m*-bit adders 45 and 46 and further added by an (*m* + 1)-bit adder 47. The output from the adder 47 is expressed in the form of an m+2 bit; but if only m bits of more significant digits are taken-out, the output becomes $\frac{1}{4}(A_{41}+A_{32}+A_{31}+A_{21})$. These adders will be described in detail later.

Data selecting circuits 48 and 49 perform the following operations respectively. The data selecting circuit 48 rewrites by the interpolation from the A sequence signal the B sequence signal which is judged by the movement detector 30 (refer to FIG. 2) to belong to a moving picture from the received A sequence signal as described previously. Namely, for example, where a waveform "*l*" shown in FIG. 7*j* is applied to a terminal 52, a signal $B_{31}'$ from the frame memory 28 is rewritten to $\frac{1}{4}(A_{41}+A_{32}+A_{31}+A_{21})$. The signal from the frame memory 28 is marked with a dash as shown in FIG. 7*d*.

The data selecting circuit 49 is driven by a signal *i* described later, by which the A sequence signal in the frame memory 28 is rewritten in the following manner. Namely, the instant the signal $A_{41}$ is received, the original signal $A_{32}'$ is rewritten to a new one $A_{32}$ and the A sequence signal in the frame memory 28 is replaced with the latest one. Its waveform is shown in FIG. 7*k*.

In FIG. 6, reference numeral 31 designates a synchronizing circuit, 53 relates to an OR circuit, 54 relates to a delay circuit, 55 a one-half counter, 56 and 57 refers to AND circuits and 58 relates to a set-reset flip-flop. Their circuit construction is identical with that shown in the lower part of FIG. 4. This circuit derives a horizontal scanning clock signal *f* and a picture element clock signal *e* from the synchronizing circuit 31, which are applied to the delay circuit 54, the one-half counter 55, the AND circuits 56 and 57 and the flip-flop 58 to provide an output *i*, which is, in turn, applied to the data selecting circuit 49 to drive it. These operations will easily be understood from the time charts *e, f, g, h* and *i* in FIG. 7.

Figure 7:
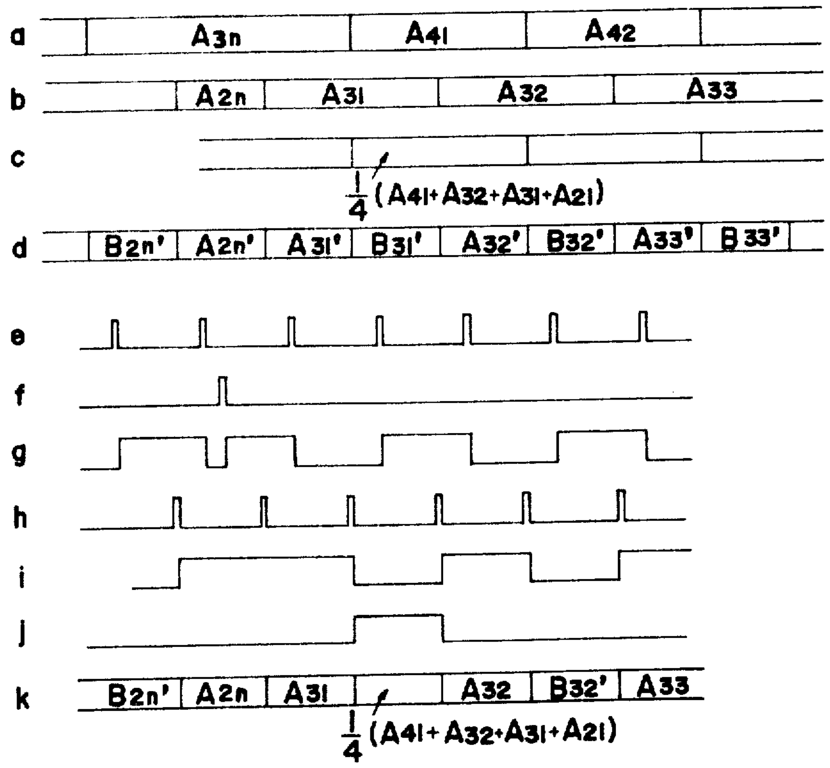
FIG. 7 is a time chart, for explaining the operation of each unit in FIG. 6.

With the above construction, in the data selecting circuit 48, the B sequence signal judged by the movement detector 30 to be a moving picture from the received A sequence signal, stored in the frame memory 28, is rewritten by the interpolation from the A sequence signal and, in the data selecting circuit 49, the A sequence signal stored in the frame memory 28 is rewritten with a newly received A sequence signal, that is, the waveform *b* (FIG. 7). Thus, it will be understood that the B sequence signal of that portion of the signal *k* fed to the frame memory 28 which has been judged to belong to the moving picture is rewritten by the interpolation from the A sequence signal simultaneously with the renewal of the A sequence signal with the latest received signal and that the signal stored in the frame memory 28 is used for the stationary picture, that is, the B sequence signal in connection with which no movement detection has been achieved.

Figure 8:
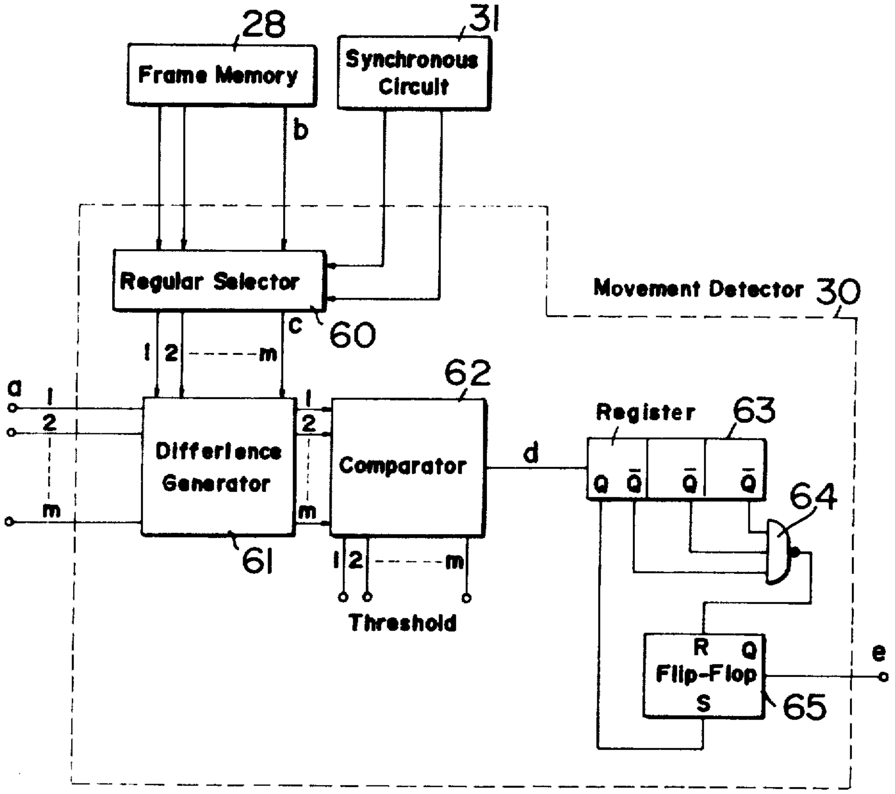
FIG. 8 is a block diagram showing one example of a movement detector employed in the system of FIG. 2.
Figure 9:
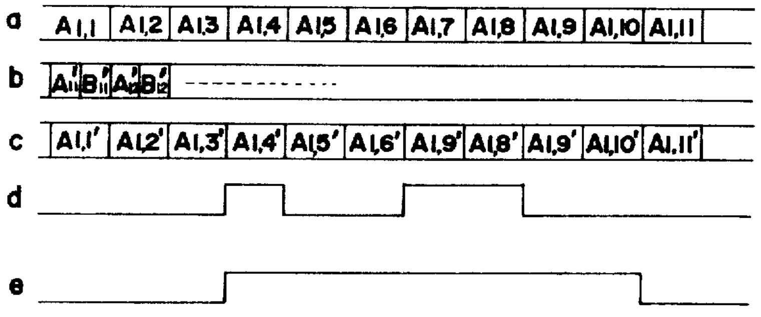
FIG. 9 is a time chart, for explaining the operation of each unit of FIG. 8.

Next, the movement detector 30 in FIG. 2 will be described with respect to FIG. 8. The broken-line block in FIG. 8 shows one example of the movement detector 30. In FIG. 8, reference numeral 60 designates a regular selector (regularly selective transmitter), 61 identifies a difference generator, 62 refers to a comparator, 63 indicates a register, 64 relates to an AND circuit, 65 refers to a set-reset flip-flop, 28 designates the frame memory and 31 indicates the synchronizing circuit. FIG. 9 illustrates time charts of the operation of the circuit of FIG. 8.

Let it be assumed that the input terminals 1, 2, . . . *m* are supplied with received A*ij* sequence signals composed of *m*-bit A sequence signals $A_{11}$, $A_{12}$, $A_{13}$, . . . $A_{21}$, $A_{22}$, . . . $A_{31}$, . . . .etc. The A*ij* sequence $A_{11}'$, $A_{12}'$, $A_{13}'$, . . . $A_{21}'$, $A_{22}'$, . . . $A_{31}'$, of the preceding frame stored in the frame memory 28, which was written in the memory after being interpolated, is separated from the B sequence. This is achieved by the regular selector 60, since the signal in the frame memory 28 contains both the A and B sequence, as described previously. The regular selector 60 is provided for taking out only the A sequence signal of the preceding frame corresponding to the aforesaid received signal and this employs exactly the same circuit as that of the regularly selective transmitter 26 described previously in connection with FIG. 4. The difference generator 61 derives therefrom the absolute value of the difference between both the A sequence signals. The comparator 62 compares a predetermined threshold value with the absolute value of the difference and provides an output 1 where the absolute value exceeds the threshold value. The waveform of the output is indicated by *d* in FIG. 9. The output derived from the comparator 62 is applied to the 3-bit register 63 and when three outputs derived at its terminals $\overline{Q}$ are all 0, the AND circuit 64 provides an output 1, by which the flip-flop 65 is reset. The flip-flop 65 is set by a Q output from the register 63 and the waveform of the output from the flip-flop 65 is indicated by *e* in FIG. 9. The output from the flip-flop 65 is applied to the adaptive interpolator 29. In this manner, the movement detection is carried out.

Figure 10:
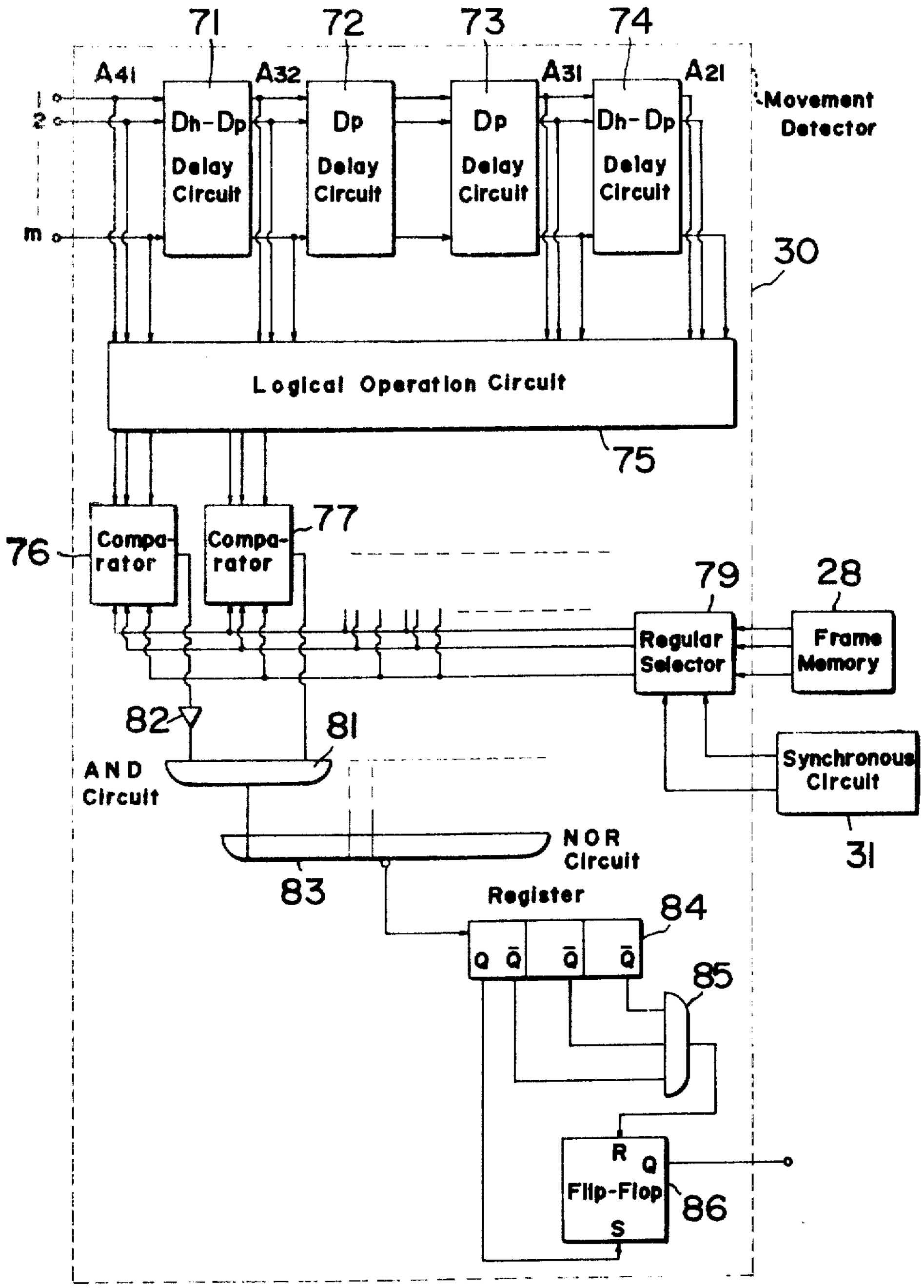
FIG. 10 is a block diagram illustrating another example of the movement detector used in the system of FIG. 2.

FIG. 10 illustrates another example of the movement detector 30 employed in FIG. 2. In FIG. 10, reference numerals 71, 72, 73 and 74 designate delay circuits. If Dh and Dp represent delays of one horizontal line period and one picture element period respectively as described previously with regard to FIG. 6, when an m-bit A sequence signal, for example, $A_{41}$ (refer to FIG. 3) is applied to the input terminal, the delay circuit 71 provides a delay (D*h*–D*p*) and its delayed output becomes $A_{32}$. The delay circuits 72 and 73 provide the delay D*h* respectively and the output from the delay circuit 73 becomes $A_{31}$. The delay circuit 74 provides the delay (D*h*–D*p*) and its delayed output becomes $A_{21}$. A logical operation circuit 75 processes the above-mentioned signals $A_{41}$, $A_{32}$, $A_{31}$ and $A_{21}$ and provides seven sets of prediction ranges for the movement judgement. Namely, if an allowable prediction error is taken as Δ, they are as follows:

$$(A_{31}-\Delta) \sim (A_{31}+\Delta)$$
$$(A_{32}-\Delta) \sim (A_{32}+\Delta)$$
$$(A_{21}-\Delta) \sim (A_{21}+\Delta)$$
$$(A_{41}-\Delta) \sim (A_{41}+\Delta)$$
$$\left(\frac{A_{31}+A_{32}}{2}-\Delta\right) \sim \left(\frac{A_{31}+A_{32}}{2}+\Delta\right)$$
$$\left(\frac{A_{21}+A_{41}}{2}-\Delta\right) \sim \left(\frac{A_{21}+A_{41}}{2}+\Delta\right)$$
$$\left(\frac{A_{31}+A_{32}+A_{21}+A_{41}}{4}-\Delta\right) \sim \left(\frac{A_{31}+A_{32}+A_{21}+A_{41}}{4}+\Delta\right)$$

Accordingly, such a method as described hereinbelow is used for juging whether the aforesaid signal, for example, $B_{31}$ belongs to a moving picture or a stationary one. Namely, it is judged whether the signal $B_{31}$ is isolated from all of the prediction ranges or not. This operaton will hereinbelow be described. Namely, the B seequence signal stored in the frame memory 28 and interpolated in the immediately previous frame, is selected by a regular selector 79. The A sequence is received by the input terminal, outputs appear at terminals corresponding to the seven sets of prediction ranges and they are compared with the B sequence signal derived from the regular selector 79. In the illustrated example, outputs appearing at output terminals $A_{41} - \Delta$ and $A_{41} + \Delta$ are compared by comparators 76 and 77 with the signal $B_{31}$. If the signal $B_{31}$ is larger than $(A_{41} - \Delta)$ but smaller than $(A_{41} + \Delta)$, the comparators 76 and 77 derive therefrom outputs 0 and 1 respectively. Reference numeral 82 indicates an inverter circuit, 81 refers to an AND circuit, and 83 identifies a NOR circuit. The output from the NOR circuit 83 is 0. The output 0 from the NOR circuit 83 implies that the prediction of at least one set of prediction range has come true. When all the predictions have gone wrong, the output from the NOR circuit 83 is 1. The output from the NOR circuit 83 is processed by a 3-bit shift register 84, an AND circuit 85 and a set-reset flip-flop 86. These circuits perform operations similar to those by the circuits 63, 64 and 65 described previously in connection with FIG. 8.

Figure 11:
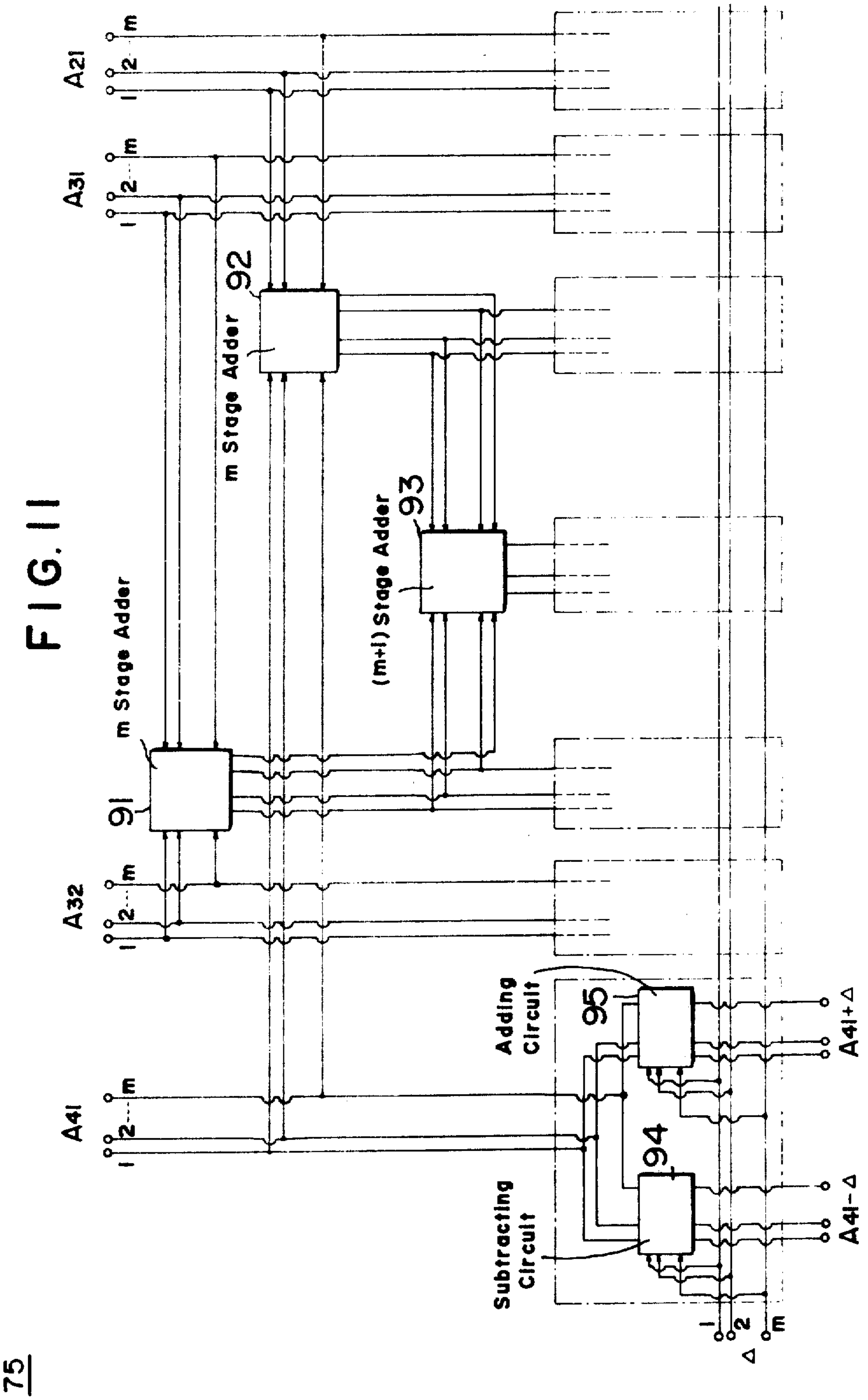
FIG. 11 is a connection diagram of a logical operation circuit employed in the detector of FIG. 10.

FIG. 11 is a connection diagram of the logical operation circuit 75 in FIG. 10, in which only the output terminals $(A_{41} - \Delta)$ and $(A_{41} + \Delta)$ are shown in detail and the other terminals are shown schematically. In FIG. 11, reference numerals 91 and 92 designate *m*-stage adding circuits, 93 refers to an (m+1)-stage adding circuit, 94 identified a subtracting circuit and 95 relates to an adding circuit. Δ indicates a predetermined permissible error range. As described previously with regard to FIG. 10, the A sequence input signal $A_{41}$ is received and the seven sets of prediction ranges are established by the signals $A_{32}$, $A_{31}$ and $A_{21}$ which are produced by applying the signal $A_{41}$ to the delay circuits. In the illustrated example, the subtracting circuit 94 subtracts $A_{41}$ and Δ one from the other to provide an output $(A_{41} - \Delta)$ and the adding circuit 95 produces an output $(A_{41} + \Delta)$. The other prediction ranges are similarly established by the signals $A_{32}$, $A_{31}$, $A_{21}$ and so on.

The foregoing has described in detail each block in FIG. 2 and circuits having special functions. The latter circuits will be described more in detail.

Figure 12:
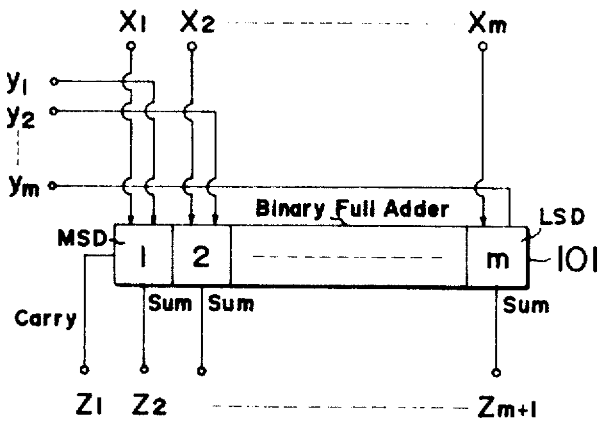
FIG. 12 is a diagram showing an m-stage adder used in the circuits of FIGS. 6 and 11.

FIG. 12 illustrates an m-stage adding circuit. The m-stage adding circuit is identified by 45 and 46 in FIG. 6, and 91 and 94 in FIG. 11. In FIG. 12, reference numeral 101 designates a binary full adder having m stages, which achieves the addition of m-bit inputs X and Y composed of $x_1, x_2, \ldots x_m$ and $y_1, y_2, \ldots y_m$. The output Z from the adder 101 is composed of $z_1, z_2, \ldots z_{m+1}$, including a carry. If m more significant digits are taken out, it follows that $Z = ½ (X + Y)$.

Next, the difference generator (61 in FIG. 8) and the comparators (62 in FIG. 8 and 76 and 77 in FIG. 10) will be described but, prior to the description of them, a subtracting circuit on which these circuits are based will be described.

Figure 13:
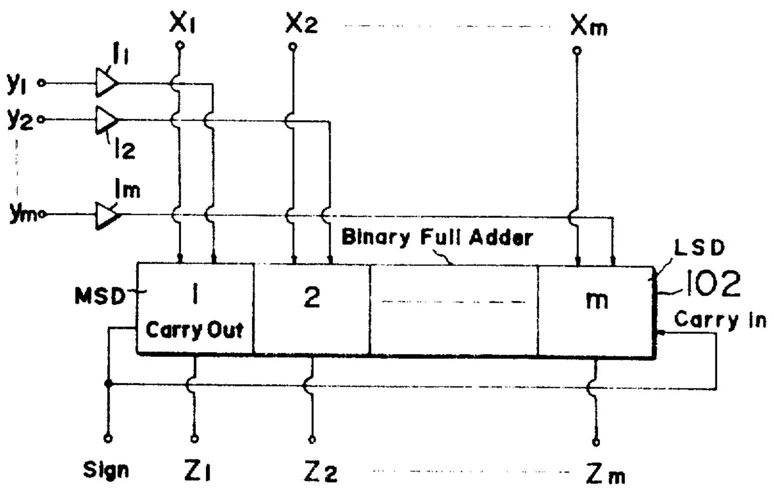
FIG. 13 is a circuit diagram, for explaining the principle of a difference generator.

FIG. 13 shows a circuit, for explaining the basic principle of the subtracting circuit, in which inputs X and Y are each composed of *m* bits and applied to an m-stage binary full adder 102. The input Y is inverted by inverters $I_1, I_2, \ldots I_m$ respectively. At output terminals of the adder 102, outputs sign, $z_1, z_2, \ldots z_m$ appear. Where the input X>Y, sign=1, and where $X \leq Y$, sign=0.

Figure 14:
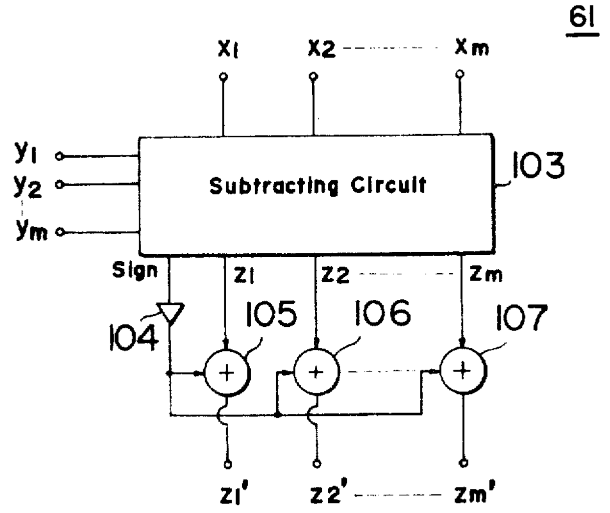
FIG. 14 is a diagram illustrating an absolute difference generator employing the difference generator of FIG. 13.

FIG. 14 illustrates the difference generator identified by 61 in FIG. 8. In FIG. 14, reference numeral 103 indicates the subtracting circuit described above with regard to FIG. 13. An output sign appearing at an output terminal of the subtracting circuit 103 is applied to an inverter 104 and the other outputs $z_1, z_2, \ldots z_m$ are applied to exclusive OR circuits 105, 106, . . . 107 respectively as shown. The output from the inverter 104 and the outputs $z_1, z_2, \ldots z_m$ are operated to derive exclusive OR outputs from the circuits 105, 106, . . . 107. The output Z from the difference generator 61 is identified by $Z_1', Z_2', \ldots Z_m'$. Accordingly, this output $Z'=|X-Y|$ represents the absolute value of the difference between the inputs X and Y.

Figure 15:
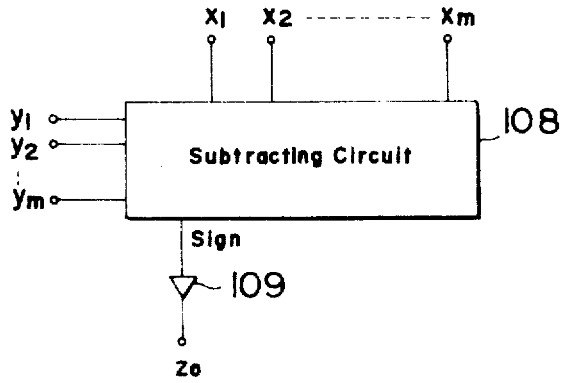
FIG. 15 shows a comparator employing the difference generator of FIG. 13.

FIG. 15 shows the comparator identified by 62 in FIG. 8 and 76 and 77 in FIG. 10. In FIG. 15, reference numeral 108 indicates the subtracting circuit described previously in connection with FIG. 13, and 109 identifies an inverter circuit connected to the output terminal Sign of the subtracting circuit 108. In FIG. 15, if the inputs X and Y are composed of m's bits: $x_1, x_2, \ldots x_m$ and $y_1, y_2, \ldots Y_m$, respectively, where $Y \geq X$, an output $z_0 = 1$ and where $Y \quad X$, $z_0 = 0$.

Figure 16:
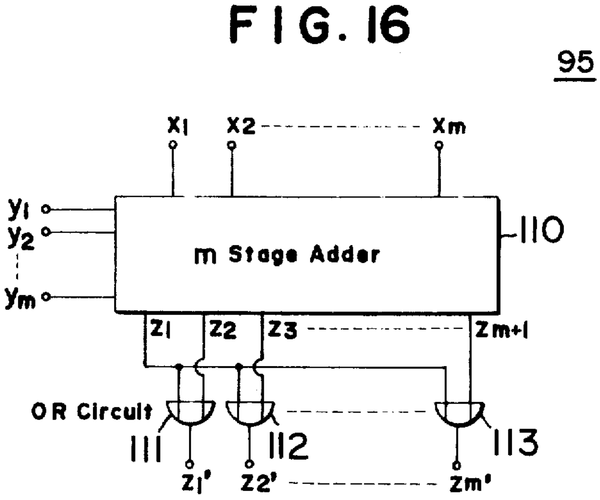
FIG. 16 illustrates one example of an adding circuit used in the circuit of FIG. 11.

Next, the adding circuit 95 of FIG. 11 will be described. FIG. 16 illustrates a diagram, for explaining the connection and function of the adding circuit 95. In the figure, reference numeral 110 designates the m-stage adder depicted in FIG. 12 and 111, 112 and 113 refer to OR circuits. Upon impression of m-bit inputs X and Y to the *m*-stage adder 110, it derives therefrom outputs $z_1, z_2, z_3, \ldots z_{m+1}$ at its output terminals, which are applied to the OR circuits 111, 112 and 113 connected as shown, providing an output Z' composed of $z_1', z_2', \ldots z_m'$ appearing at their output terminals. Accordingly, when the sum of the inputs X and Y does not overflow by carry, that is, when $X + Y < 2^m$, $$Z' = (z_1', z_2', \ldots z_m') = X + Y$$

when $X + Y \geq 2^m$, that is, when the sum overflows by carry, $$Z' = 2^m - 1$$

that is, an output forcibly suppressed to the number of the most significant digit is taken out.

Figure 17:
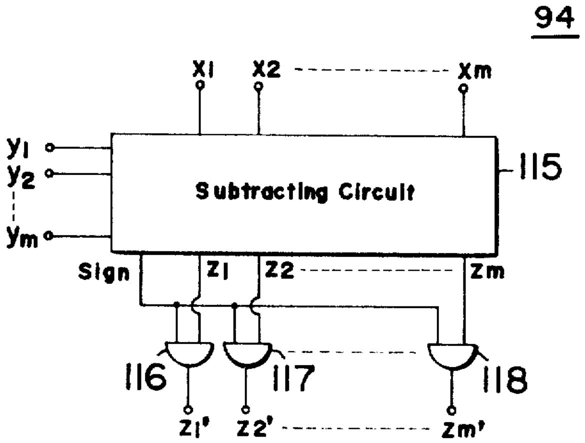
FIG. 17 shows one example of a subtracting circuit employed in the circuit of FIG. 11.

Next, the subtracting circuit 94 in FIG. 11 will be described. FIG. 17 is a diagram, for explaining the circuit connection and function of the circuit 94. In FIG. 17, reference numeral 115 indicates the subtracting circuit depicted in FIG. 13, and 116, 117 and 118 identify AND circuits. Impressed with $m$-bit inputs X and Y, the subtracting circuit 115 derives at its output terminals outputs Sign, $z_1, z_2, \ldots z_m$, which are applied to the AND circuits 116, 117 and 118 to provide an output $Z'$ composed of $z_1', z_2', \ldots z_m'$. Accordingly, when $X>Y$, $Z' = X - Y$ and when $X<Y$, $Z' = 0$.

The foregoing has described the system of this invention and illustrative embodiments of circuits employed therein. The foregoing description has been given in connection with the case where the video signal is not interlaced but this invention is also applicable to an interlaced video signal. The regularly selective system is not limited specifically to that described with regard to FIG. 3 and the interpolation system is also not limited to the described one. Further, in FIG. 2, the video input and output signals and the transmission line signal are PCM signals but it is also possible to use PAM, PCM, DPCM, ΔM and like signal together by properly inserting a signal converter.

It will be apparent that many modifications and variations may be effected without departing from the scope of the novel concepts of this invention.

We claim as our invention:

1. A video signal transmission system for transmitting a video signal of compressed bandwidth over a transmission medium, wherein the video signal to be transmitted defines successive picture frames, each of plural picture elements, said system comprising:

A. a transmission station including:
   1. a synchronizing signal generator for producing a first clock signal synchronized with the video signal; and
   2. a regularly selective transmitter responsive to the first clock signal for removing from the video signal to be transmitted, selected ones of the picture elements of each picture frame, thereby forming and transmitting a video signal sequence corresponding to said selected picture elements, in succession, and B. a receiving station including:
   1. a synchronizing signal generator for producing a second clock signal synchronized with the first clock signal of said transmission station;
   2. a frame memory for storing the transmitted video signal sequence corresponding to the selected picture elements of one frame;
   3. a movement detector for comparing the video signal sequence transmitted from said transmission station for a given frame, as received, with the video signal sequence of a previous picture frame, as previously received and stored in said frame memory, for judging whether the video signal sequence of the said given frame belongs to a moving picture or to a stationary picture and for producing a movement detecting signal in accordance therewith; and
   4. an adaptive interpolator responsive to successive, received video signal sequences, for replacing the video signal sequence of a given frame stored in same frame memory with the next successive, received video signal sequence for the successive frame, and selectively operable in response to the movement detecting signal for a stationary picture, to interpolate and produce from the said stored, second video signal sequence a corresponding, successive second video signal sequence and replace the said stored second sequence of said frame memory with the said successive video sequence interpolated therefrom, and, for a moving picture, to interpolate and produce from the said next successive received video sequence a corresponding, succesive second video signal sequence and replace the said stored second sequence with said second video signal sequence interpolated from the said received, next successive video signal sequence, thereby to store in said memory a video signal sequence for the plural picture elements of one frame.

2. A video signal transmission system according to claim 1, wherein said movement detector compares the video signal level of the sequence transmitted from said transmitting station with that signal level of the video signal of the sequence stored in said frame memory and, in response to a detected difference in level therebetween in excess of a predetermined value, providing a manifestation that the video signal of the sequence transmitted belongs to the moving picture.

3. A video signal transmission system according to claim 1, wherein said movement detector includes means for predicting a plurality of values predetermined dependent upon the video signal of the sequence transmitted from said transmitting station, and a regular selector for selectively extracting a video signal of a sequence different from the sequence transmitted from said frame memory, said prediction means responsive to the condition that the video signal level obtained from the regular selector is different from any one of the plurality of predictive value produced by the prediction means, for indicating that the transmitted video signal belongs to the moving picture.

4. A video signal transmission system according to claim 1, wherein said regularly selective transmitter removes selected ones of the picture elements of the video signal in a one-by-one manner to form the video signal into said selected and said unselected sequences.

5. A video signal transmission system according to claim 4, wherein said regularly selective transmitter includes a 1/2 counter driven by a picture element clock signal and a horizontal synchronizing signal from the synchronizing signal generator, a delay circuit for delaying the picture element clock signal to synchronize it with the center of the picture element signal, an AND gate circuit for producing a logical product output of the output from the one-half counter and the delayed clock signal from said delay circuit, whereby a clock signal synchronized with the video signal is derived from said AND gate circuit, and flip-flops driven by the output from said AND gate circuit to select the picture elements of the video signal.

6. A video signal transmission system according to claim 5, wherein said regularly selective transmitter comprises flip-flops and is driven by the output from said AND gate circuit to provide a video signal.

* * * * *